United States Patent [19]

Agano et al.

[11] Patent Number: 5,532,727

[45] Date of Patent: Jul. 2, 1996

[54] APPARATUS AND METHOD OF THERMALLY RECORDING INFORMATION WITH SHADING CORRECTION

[75] Inventors: Toshitaka Agano; Takashi Shoji, both of Kanagawa-ken, Japan

[73] Assignee: Fuji Photo Film Co., Ltd., Kanagawa, Japan

[21] Appl. No.: 186,473

[22] Filed: Jan. 26, 1994

[30] Foreign Application Priority Data

Jan. 28, 1993 [JP] Japan ................................ 5-012526

[51] Int. Cl.⁶ .......................... B41J 2/47; B41J 2/435; H01S 3/00; G01D 15/14
[52] U.S. Cl. ...................... 347/253; 347/237; 347/240; 347/243; 347/247; 347/251
[58] Field of Search ............................. 346/108, 160, 346/76 L; 347/237, 240, 243, 247, 251, 253

[56] References Cited

U.S. PATENT DOCUMENTS

| | | | |
|---|---|---|---|
| 4,415,913 | 11/1983 | Diddens | 358/298 |
| 5,041,866 | 8/1991 | Imoto | 355/38 |
| 5,289,210 | 2/1994 | Takayanagi | 347/14 |
| 5,369,423 | 11/1994 | Hunter et al. | 347/255 |

FOREIGN PATENT DOCUMENTS

| | | |
|---|---|---|
| 50-23617 | 3/1975 | Japan . |
| 58-94494 | 6/1983 | Japan . |
| 61-291183 | 12/1986 | Japan . |
| 62-77983 | 4/1987 | Japan . |
| 62-78964 | 4/1987 | Japan . |
| 2-58973 | 2/1990 | Japan . |
| 5-24219 | 2/1993 | Japan . |
| 5-301447 | 11/1993 | Japan . |

*Primary Examiner*—Benjamin R. Fuller
*Assistant Examiner*—Raquel Yvette Gordon
*Attorney, Agent, or Firm*—Sughrue, Mion, Zinn, Macpeak & Seas

[57] ABSTRACT

A laser beam of a constant intensity is generated by a semiconductor laser and applied to a thermosensitive recording medium. The density of a colored recorded area of the thermosensitive recording medium is detected by a densitometer, and shading correcting data for making the density of the colored recorded area constant based on the detected density are stored in a shading data memory. A controller reads the stored shading correcting data and controls the intensity of the laser beam generated by the semiconductor laser based on the shading correcting data for thereby compensating for variations in the level of an image signal due, for example, to intensity irregularities of the laser beam applied to the thermosensitive recording medium and irregularities of the speed at which the thermosensitive recording medium is scanned with the laser beam.

9 Claims, 7 Drawing Sheets

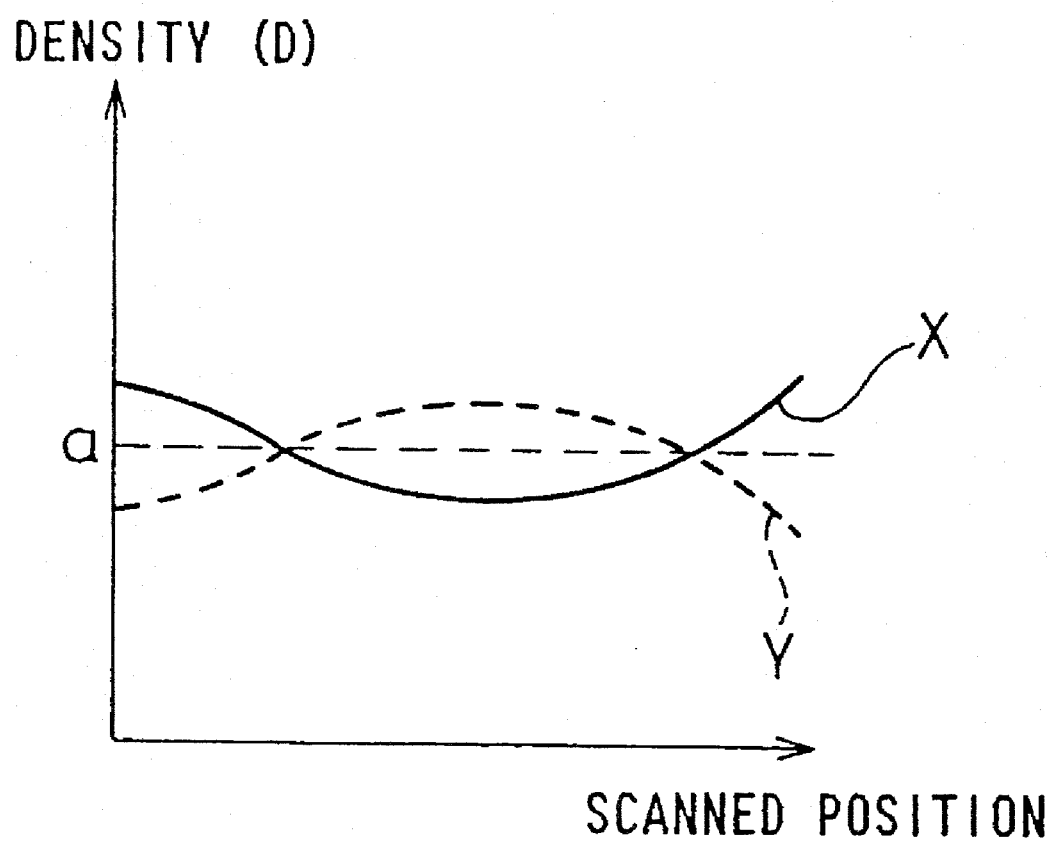

APPARATUS AND METHOD OF THERMALLY RECORDING INFORMATION WITH SHADING CORRECTION

BACKGROUND OF THE INVENTION

1. Field of the Invention:

The present invention relates to an apparatus and a method of thermally recording information, e.g., character and image information, while correcting shading, i.e., density variations of recorded information, on a thermosensitive recording medium that is colored to a density depending on the thermal energy applied thereto.

2. Description of the Related Art:

Thermal recording apparatus for applying thermal energy to a thermosensitive recording medium to record information such as an image thereon are in wide use. Particularly, thermal recording apparatus which employ a laser as a thermal energy source for high-speed recording are known from Japanese laid-open patent publications Nos. 50-23617, 58-94494, 62-77983, and 62-78964, for example.

The applicant has developed a thermal recording medium capable of recording a high-quality image for use in such thermal recording apparatus. The thermosensitive recording medium comprises a support coated with a coloring agent, a color developer, and light-absorbing dyes, and produces a color whose density depends on the thermal energy that is applied to the thermosensitive recording medium. The applicant has also developed an apparatus for recording an image or other information on the thermosensitive recording medium with a laser beam. For details, reference should be made to Japanese laid-open patent publications Nos. 5-301447 and 5-24219.

The thermosensitive recording medium has a thermosensitive layer on the support. The thermosensitive layer is produced by coating a coating solution on the support. The coating solution contains an emulsion which is prepared by dissolving thermally fusible microcapsules containing at least a basic dye precursor, a color developer, and light-absorbing dyes into an organic solvent that is either slightly water-soluble or water-insoluble, and then emulsifying and dispersing the dissolved materials.

The basic dye precursor produces a color by donating electrons or accepting protons from an acid or the like. The basic dye precursor comprises a compound which is normally substantially colorless and has a partial skeleton of lactone, lactam, sultone, spiropyran, ester, amide, or the like, which can be split or cleaved upon contact with the color developer. Specifically, the compound may be crystal violet lactone, benzoil leucomethylene blue, malachite green lactone, rhodamine B lactam, 1,3,3-trimethyl-6'-ethyl-8'-butoxyindolino-benzospiropyran, or the like.

The color developer may be of an acid substance such as a phenolic compound, an organic acid or its metal salt, oxybenzoate, or the like. The color developer should preferably have a melting point ranging from 50° C. to 250° C. Particularly, it should be of a slightly water-soluble phenol or organic acid having a melting point ranging from 60° C. to 200° C. Specific examples of the color developer are disclosed in Japanese laid-open patent publication No. 61-291183.

The light-absorbing dyes should preferably comprise dyes which absorb less light in a visible spectral range and have a particularly high rate of absorption of radiation wavelengths in an infrared spectral range. Examples of such dyes are cyanine dyes, phthalocyanine dyes, pyrylium and thiopyrylium dyes, azulenium dyes, squarylium dyes, metal complex dyes containing Ni, Cr, etc., naphtoquinone and anthraquinne dyes, indophenol dyes, indoaniline dyes, triphenylmethane dyes, triallylmethane dyes, aminium and diimmonium dyes, nitroso compounds, etc. Of these dye materials, those which have a high radiation absorption rate in a near-infrared spectral range whose wavelength ranges from 700 nm to 900 nm are particularly preferable in view of the fact that practical semiconductor lasers have been developed for generating near-infrared laser radiation.

There is known an image information reading apparatus which scans a surface on which image information is recorded with a light beam to cause the surface to emit light representing the recorded image information, and photoelectrically detects the emitted light to produce an image signal with a photoelectric transducer. The applicant has proposed a method of correcting shading, i.e., level variations in an image signal, and hence density variations of a recorded image, due to intensity variations of a scanning light beam, scanning speed variations of the scanning light beam, and detection variations of the photoelectric transducer in the image information reading apparatus (see Japanese laid-open patent publication No. 2-58973). The proposed shading correcting method is capable of correcting shading effectively in an image information reading apparatus which employs a rotating polygonal mirror, making it possible to read image information recorded on a surface which is scanned by a light beam.

Such shading occurs also in a thermal recording apparatus which produces a desired image by coloring a thermosensitive recording medium. For example, shading is produced when the intensity of a light beam for recording an image is varied if the reflectances of mirror facets of a polygonal mirror for scanning the light beam differ from each other, each of the mirror facets suffers reflectance variations, or the transmittance of the lens of an image recording optical system varies depending on the scanned position. The image density also varies when the speed of a feed unit which feeds the thermosensitive recording medium in an auxiliary scanning direction.

SUMMARY OF THE INVENTION

It is therefore an object of the present invention to provide an apparatus and a method of thermally recording information, such as character and image information, while correcting shading, i.e., density variations of recorded information, caused by intensity variations of a light beam that scans a thermosensitive recording medium, scanning speed variations of the light beam, and various other fluctuations.

To achieve the above object, there is provided in accordance with the present invention a thermal recording apparatus comprising preheating means for preheating a thermosensitive recording medium, which has a support coated with a coloring agent, a color developer, and light-absorbing dyes, and can be colored to a density depending on thermal energy imparted thereto at a coloring temperature, along a scanning direction to a temperature below the coloring temperature, heating means energizable based on an image signal for applying a light beam to the thermosensitive recording medium along the scanning direction to heat the thermosensitive recording medium to the coloring temperature to color the thermosensitive recording medium for thereby recording information based on the image signal, density detecting means for detecting the density of a colored area of the thermosensitive recording medium, and shading correcting means for controlling the light beam generated by the heating means based on a density signal from the density detecting means for thereby correcting density irregularities on the thermosensitive recording medium.

According to the present invention, there is also provided a thermal recording apparatus comprising preheating means for preheating a thermosensitive recording medium, which has a support coated with a coloring agent, a color developer, and light-absorbing dyes, and can be colored to a density depending on thermal energy imparted thereto at a coloring temperature, along a main scanning direction to a temperature below the coloring temperature, auxiliary scanning means for moving the thermosensitive recording medium in an auxiliary scanning direction substantially perpendicular to the main scanning direction, heating means energizable based on an image signal for applying a light beam to the thermosensitive recording medium along the main scanning direction to heat the thermosensitive recording medium to the coloring temperature to color the thermosensitive recording medium for thereby recording information based on the image signal, speed variation detecting means for detecting variations in a speed at which the thermosensitive recording medium is moved by the auxiliary scanning means, and shading correcting means for controlling the light beam generated by the heating means based on a speed variation signal from the speed variation detecting means for thereby compensating for the variations in the speed at which the thermosensitive recording medium is moved by the auxiliary scanning means.

The shading correcting means may comprise means for controlling both the light beam generated by the heating means and the heat generated by the preheating means, or means for controlling only the heat generated by the preheating means.

According to the present invention, there is also provided a thermal recording apparatus comprising preheating means for preheating a thermosensitive recording medium, which has a support coated with a coloring agent, a color developer, and light-absorbing dyes, and can be colored to a density depending on thermal energy imparted thereto at a coloring temperature, along a scanning direction to a temperature below the coloring temperature, laser beam generating means energizable by an image signal for applying a laser beam to the thermosensitive recording medium to heat and color the thermosensitive recording medium at the coloring temperature, light deflecting means positioned between the laser beam generating means and the thermosensitive recording medium and having a plurality of light deflectors for reflecting or transmitting the laser beam from the laser beam generating means to deflect the scanning direction, data storage means for separately storing an average curve representing the average of respective variations curves within a scanning cycle of variations in laser beam transfer ratios of the light deflectors, respectively, and difference curves representing the differences between the variations curves and the average curve, and shading correcting means for controlling the laser beam generated by the laser beam generating means based on the difference curves and controlling the heat generated by the preheating means based on the average curve thereby to compensating for the variations in the laser beam transfer ratios of the light deflectors.

The data storage means may comprise means for separately storing the variations curves within the scanning cycle of the variations in the laser beam transfer ratios of the light deflectors, respectively, and the shading correcting means may comprise means for controlling the laser beam generated by the laser beam generating means based on the variation curves.

Alternatively, the data storage means may comprise means for separately storing the variations curves within the scanning cycle of the variations in the laser beam transfer ratios of the light deflectors, respectively, and the shading correcting means may comprise means for controlling the heat generated by the preheating means based on the variation curves.

According to the present invention, there is further provided a method of thermally recording information on a thermosensitive recording medium, which has a support coated with a coloring agent, a color developer, and light-absorbing dyes, and can be colored to a density depending on thermal energy imparted thereto at a coloring temperature, the method comprising the steps of preheating the thermosensitive recording medium along a scanning direction to a temperature below the coloring temperature, applying a light beam modulated by an image signal to the thermosensitive recording medium along the scanning direction to heat the thermosensitive recording medium to the coloring temperature to color the thermosensitive recording medium for thereby recording information based on the image signal, generating shading correcting data based on the density of a colored area of the thermosensitive recording medium, and controlling the light beam based on the shading correcting data for thereby correcting density irregularities on the thermosensitive recording medium.

According to the present invention, there is also provided a method of thermally recording information on a thermosensitive recording medium, which has a support coated with a coloring agent, a color developer, and light-absorbing dyes, and can be colored to a density depending on thermal energy imparted thereto at a coloring temperature, the method comprising the steps of preheating the thermosensitive recording medium along a main scanning direction to a temperature below the coloring temperature, moving the thermosensitive recording medium in an auxiliary scanning direction substantially perpendicular to the main scanning direction, applying a light beam modulated by an image signal to the thermosensitive recording medium along the main scanning direction to heat the thermosensitive recording medium to the coloring temperature to color the thermosensitive recording medium for thereby recording information based on the image signal, generating shading correcting data based on variations in a speed at which the thermosensitive recording medium is moved in the auxiliary scanning direction, and controlling the light beam based on the shading correcting data for thereby compensating for the variations in the speed at which the thermosensitive recording medium is moved in the auxiliary scanning direction.

Both the light beam and the heat applied to preheat the thermosensitive recording medium may be controlled based on the shading correcting data, or only the heat applied to preheat the thermosensitive recording medium may be controlled based on the shading correcting data.

According to the present invention, there is further provided a method of thermally recording information on a thermosensitive recording medium, which has a support coated with a coloring agent, a color developer, and light-absorbing dyes, and can be colored to a density depending on thermal energy imparted thereto at a coloring temperature, the method comprising the steps of preheating the thermosensitive recording medium along a scanning direction to a temperature below the coloring temperature, deflecting a laser beam modulated by an image signal with deflecting means to scan the thermosensitive recording medium in the scanning direction to heat and color the thermosensitive recording medium at the coloring temperature, generating shading correcting data based on variations in laser beam transfer ratios of the deflecting means, and controlling the laser beam and the heat applied to preheat the thermosensitive recording medium based on the shading correcting data to compensating for the variations in the laser beam transfer ratios of the deflecting means.

The laser beam may be controlled based on the shading correcting data, or only the heat applied to preheat the thermosensitive recording medium may be controlled based on the shading correcting data.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 2 is a diagram showing the density of a recorded image which is detected by a densitometer;

DETAILED DESCRIPTION OF THE PREFERRED EMBODIMENTS (1st Embodiment)

Figure 1:
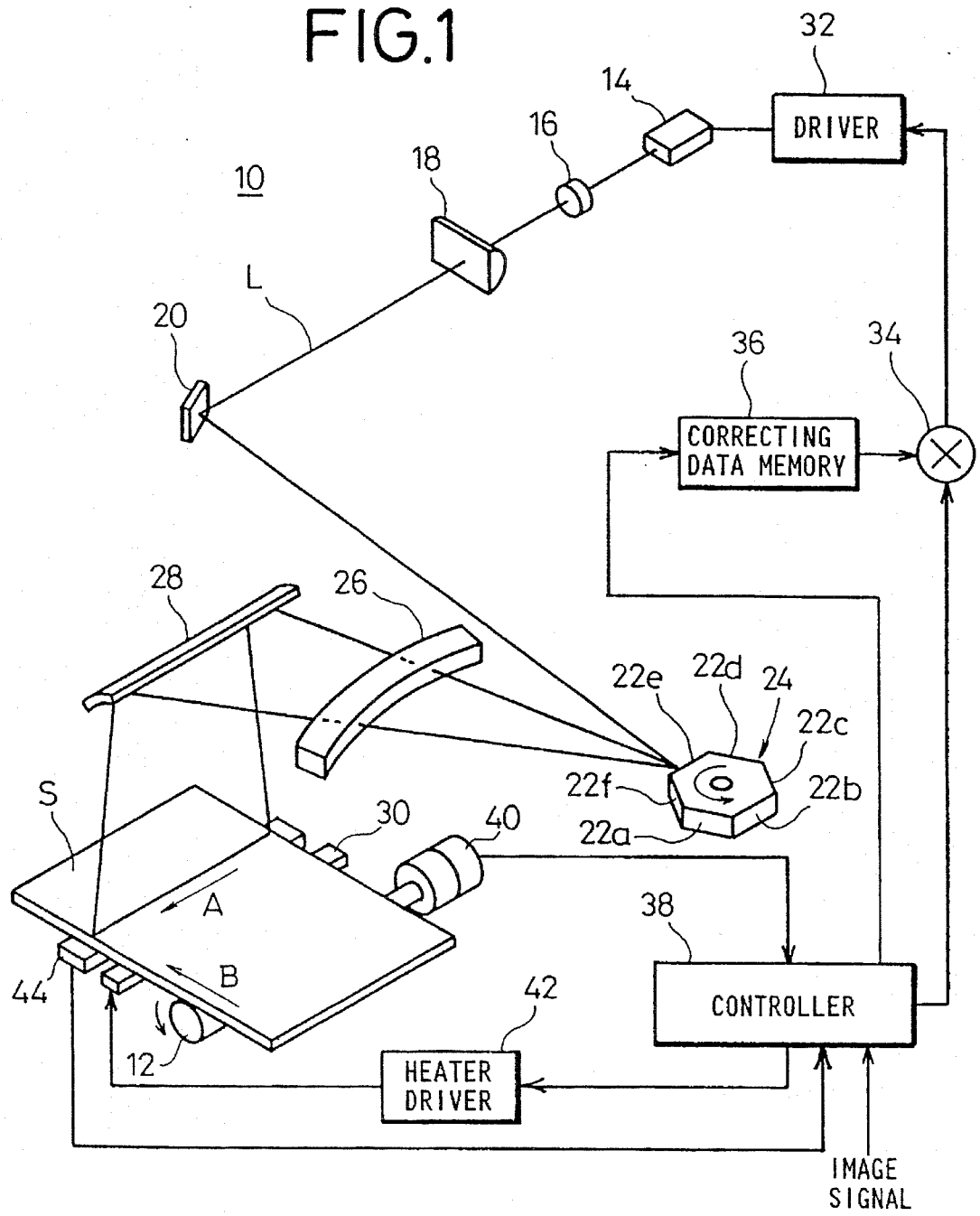
FIG. 1 is a schematic perspective view, partly in block form, of thermal recording apparatus according to first and second embodiments of the present invention.

FIG. 1 shows a thermal recording apparatus 10 with a shading correcting capability according to a first embodiment of the present invention. The thermal recording apparatus 10 scans a thermosensitive recording medium S with a laser beam L in a main scanning direction indicated by the arrow A while the thermosensitive recording medium S is being fed by a feed roller (auxiliary scanning means) 12 in an auxiliary scanning direction indicated by the arrow B which is perpendicular to the main scanning direction A, for thereby recording desired information such as character and image information on the thermosensitive recording medium S. The thermosensitive recording medium S comprises a support coated with a coloring agent, a color developer, and light-absorbing dyes, and produces a color whose density depends on the thermal energy that is applied to the thermosensitive recording medium S, as disclosed in Japanese laid-open patent publications Nos. 5-301447 and 5-24219.

The thermal recording apparatus 10 comprises a laser beam generator such as a semiconductor laser (heating means) 14 for generating the laser beam L to heat the thermosensitive recording medium S to a temperature at which the thermosensitive recording medium S is colored (hereinafter referred to as a "coloring temperature"), a collimator lens 16 for converting the laser beam L to a parallel laser beam L, a cylindrical lens 18 for passing the laser beam L therethrough, a reflecting mirror 20 for reflecting the laser beam L, a polygonal mirror (light deflecting means) 24 having mirror facets 22a through 22f and rotatable for deflecting the laser beam L, an fθ lens 26 for passing the laser beam L therethrough, and a cylindrical mirror 28 for reflecting the laser beam L.

Figure 3A:
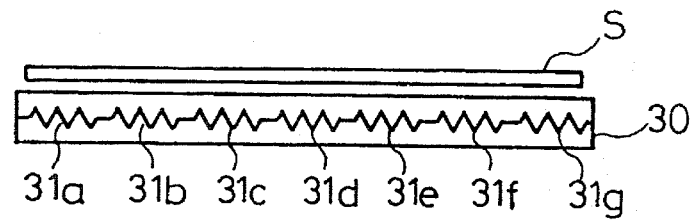
FIG. 3A is a schematic view of heater elements of a preheater for preheating a thermosensitive recording medium.
Figure 3B:
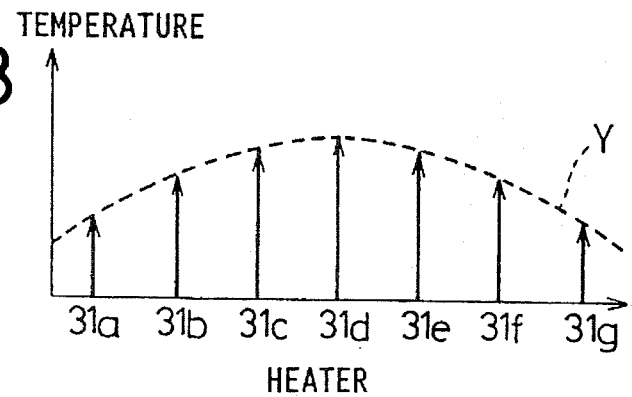
FIG. 3B a diagram showing temperatures achieved by the heater elements.
Figure 3C:
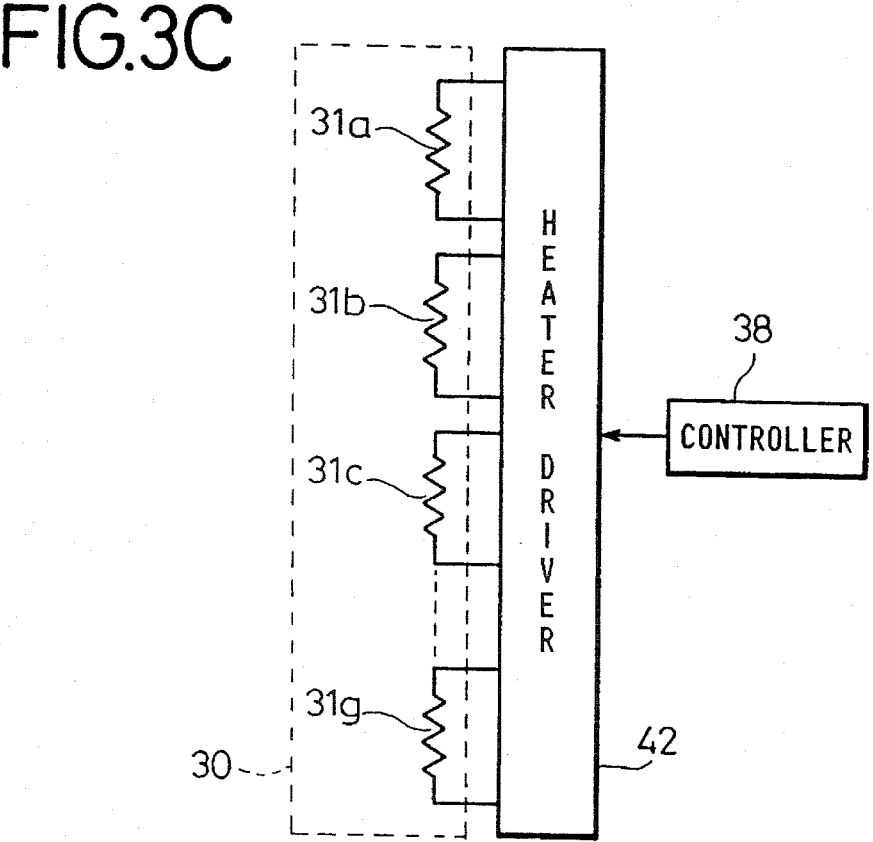
FIG. 3C is a block diagram of a controller, a heater driver, and the preheater.

The thermal recording apparatus 10 also includes a preheater (preheating means) 30 positioned below and extending across the thermosensitive recording medium S for preheating the thermosensitive recording medium S to a temperature below the coloring temperature along the main scanning direction A. As shown in FIGS. 3A and 3C, the preheater 30 comprises an array of heater elements 31a through 31g along the main scanning direction.

As shown in FIG. 1, the semiconductor laser 14 is energized by a driver 32 which is connected to a multiplier 34. The multiplier 34 is supplied with an image signal from a controller 38 and also with shading correcting data from a correcting data memory 36 that is connected to the controller 38. To the controller 38, there are also connected a tachometer 40 for detecting the rotational speed of the feed roller 12 which feeds the thermosensitive recording medium S in the auxiliary scanning direction B, a heater driver 42 for energizing the preheater 30, and a densitometer 44 disposed closely to the thermosensitive recording medium S for detecting the density in the main scanning direction A of a recorded area of the thermosensitive recording medium S which is heated by the laser beam L applied from the semiconductor laser 14.

Operation of the thermal recording apparatus 10 will be described below.

The controller 38 controls the driver 32 to energize the semiconductor laser 14, which emits a laser beam L having a certain intensity. The laser beam L emitted from the semiconductor laser 14 passes through the collimator lens 16 and the cylindrical lens 18 and is reflected to the polygonal mirror 24 by the reflecting mirror 20 which is being rotated. The mirror facets 22a through 22f of the rotating polygonal mirror 20 deflect the laser beam L, and the deflected laser beam L travels through the fθ lens 26 and is reflected to the thermosensitive recording medium S by the cylindrical mirror 28.

Immediately before or at the same time that the thermosensitive recording medium S is irradiated with the laser beam L, the controller 38 also controls the heater driver 42 to energize the heater elements 31a through 31g of the preheater 30 to preheat the thermosensitive recording medium S uniformly to a temperature immediately below the coloring temperature. Therefore, when the heat of the laser beam L emitted from the semiconductor laser 14 is applied to the thermosensitive recording medium S is colored to a density depending on the thermal energy of the applied laser beam L.

The densitometer 44, which is positioned near the recorded area of the thermosensitive recording medium S, detects the density in the main scanning direction of the recorded area, which is heated by the laser beam L, of the thermosensitive recording medium S. The densitometer 44 supplies a detected signal, indicative of the detected density, to the controller 38. The density detected by the densitometer 44 is represented by a solid-line curve X, for example, shown in FIG. 2. The detected density is not constant, i.e., varies depending on the scanned position on the thermosensitive recording medium S, because of shading of the information recorded on the thermosensitive recording medium S. To make the density constant, shading correcting data represented by a broken-line curve Y in FIG. 2 are stored in the correcting data memory 36. The curves X, Y are symmetrical with respect to a certain constant density level a.

To record a desired image on the thermosensitive recording medium S, the controller 38 applies a supplied image signal to the multiplier 34 and reads shading correcting data corresponding to the recorded position in the main scanning direction of the supplied image signal from the correcting data memory 36. The controller 38 supplies the read shading correcting data to the multiplier 34, which then multiplies the image signal from the controller 38 by the shading correcting data. The multiplier 34 supplies a product signal, i.e., a shading-corrected image signal, to the driver 32, which controls the output intensity of the laser beam produced by the semiconductor laser 14 based on the supplied signal. Therefore, the output intensity of the laser beam produced by the semiconductor laser 14 and applied to the thermosensitive recording medium S is corrected on the basis of the shading correcting data. The thermal recording apparatus 10 can thus correct density variations in the main scanning direction on the thermosensitive recording medium S which density variations may be caused by different reflectances of the mirror facets 22a~22f of the polygonal mirror 24, different transmittances of the optical system of the thermal recording apparatus 10, and other factors.

For correcting shading with the preheater 30, the controller 38 may control the heater driver 42 based on the density detected by the densitometer 44 to energize the heater elements 31a through 31g to heat the thermosensitive recording medium S in conformity with a temperature distribution (see FIG. 3B) corresponding to the density curve Y in FIG. 2.

Figure 4A:
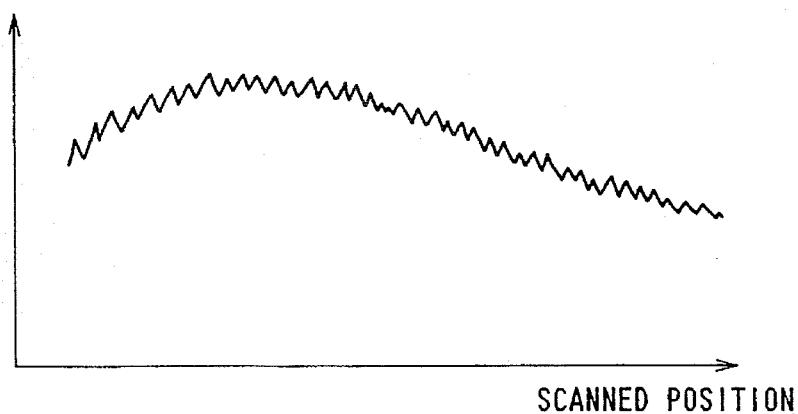
FIG. 4A is a diagram showing shading characteristics including a high-frequency component.
Figure 4B:
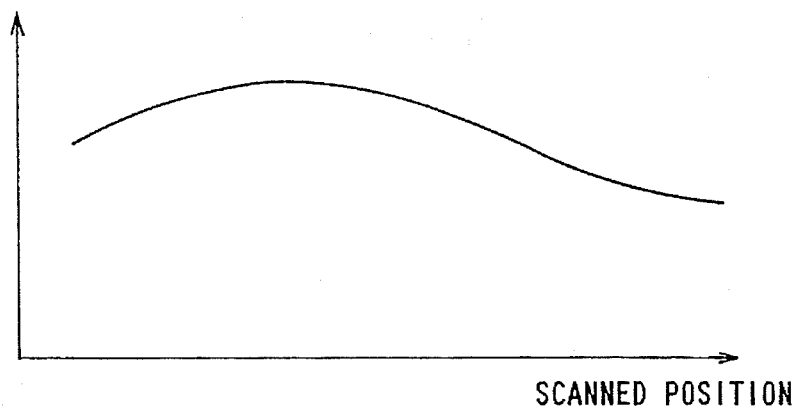
FIG. 4B is a diagram showing a low-frequency component of the shading characteristics shown in FIG. 4A.
Figure 4C:
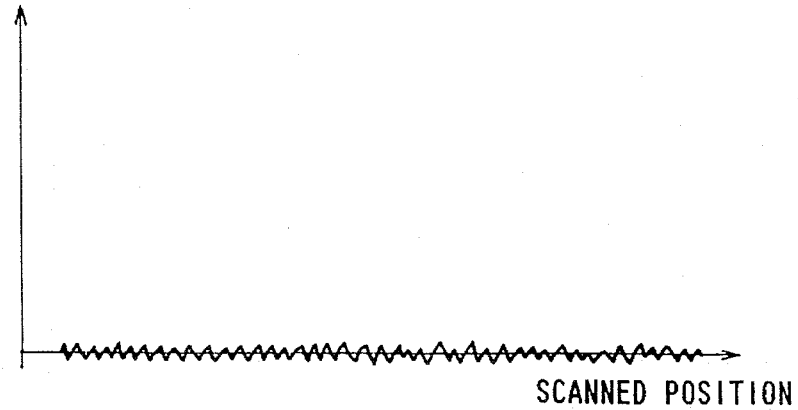
FIG. 4C is a diagram showing the high-frequency component of the shading characteristics shown in FIG. 4A.

If shading contains a high frequency component as shown in FIG. 4A, then the controller 38 may divide the shading data into a low-frequency component as shown in FIG. 4B and a high-frequency component as shown in FIG. 4C, and may control the thermal energy produced by the preheater 30 so as to cancel out the low-frequency component of the shading data and also control the intensity of the laser beam produced by the semiconductor laser 14 so as to cancel out of the high-frequency component of the shading data.

(2nd Embodiment)

According to a second embodiment of the present invention, the thermal recording apparatus 10 shown in FIG. 1 is arranged to correct shading due to variations in the speed at which the thermosensitive recording medium S is fed in the auxiliary scanning direction B.

When the feed roller 12 is rotated about its own axis, the thermosensitive recording medium S is fed in the auxiliary scanning direction B. At this time, the rotational speed of the feed roller 12 is detected by the tachometer 40. The tachometer 40 supplies a detected signal representing the detected rotational speed to the controller 38. The controller 38 now serves as a speed variation correcting means for correcting density variations due to variations in the rotational speed of the feed roller 12. More specifically, when the rotational speed of the feed roller 12 drops below a predetermined speed, the controller 38 lowers the level of the image signal in order to prevent the thermosensitive recording medium S from being excessively heated, and when the rotational speed of the feed roller 12 exceeds the predetermined speed, the controller 28 increases the level of the image signal in order to apply a required amount of heat to the thermosensitive recording medium S. The image signal thus corrected is multiplied by the shading correcting data in the main scanning direction by the multiplier 34. The product signal from the multiplier 34 is applied to the driver 32, which controls the intensity of the laser beam generated by the semiconductor laser 14 for thereby correcting the laser beam intensity based on the variations in the rotational speed of the feed roller 12. Consequently, the thermal recording apparatus 10 can correct variations in the density in the main scanning direction on the thermosensitive recording medium S, and also correct variations in the density due to variations in the rotational speed of the feed roller 12.

The controller 38 may correct density variations in the auxiliary scanning direction by correcting the temperatures of the heater elements 31a through 31g of the preheater 30.

As with the first embodiment, if shading contains a high frequency component, then the controller 38 may divide the shading data into a low-frequency component and a high-frequency component, and may control the thermal energy produced by the preheater 30 so as to cancel out the low-frequency component of the shading data and also control the intensity of the laser beam produced by the semiconductor laser 14 so as to cancel out of the high-frequency component of the shading data.

(3rd Embodiment)

Figure 5:
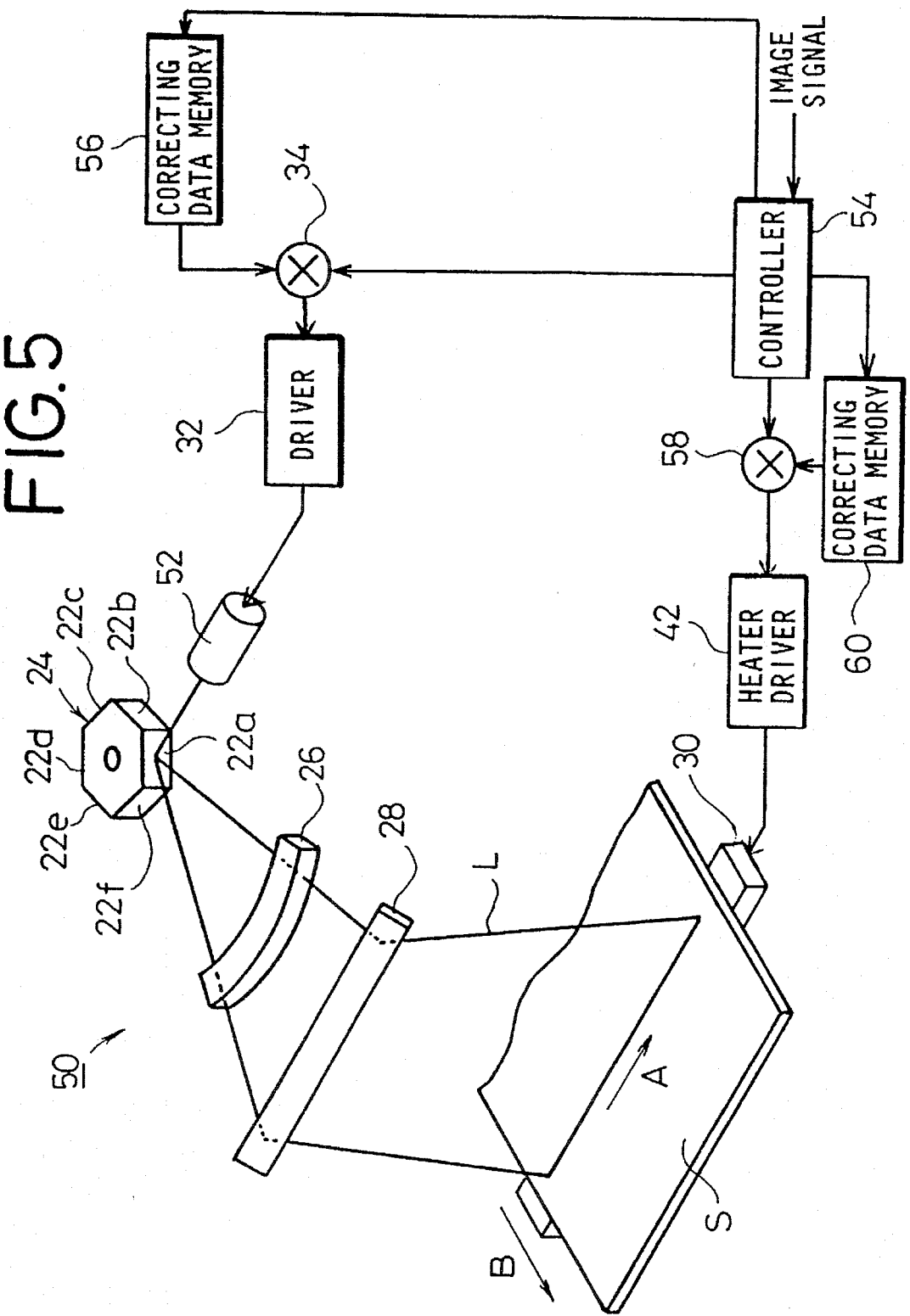
FIG. 5 is a schematic perspective view, partly in block form, of a thermal recording apparatus according to a third embodiment of the present invention.

FIG. 5 shows a thermal recording apparatus according to a third embodiment of the present invention. The thermal recording apparatus shown in FIG. 5 is arranged to correct shading due to different reflectances of the mirror facets 22a through 22f of the polygonal mirror 24. Those parts shown in FIG. 5 which are identical to those shown in FIG. 1 are denoted by identical reference numerals and characters, and will not be described in detail.

The thermal recording apparatus 50 comprises a laser beam generator such as a semiconductor laser (laser beam generating means) 52 for generating a laser beam L to heat a thermosensitive recording medium S to a coloring temperature, a polygonal mirror 24 having mirror facets 22a through 22f and rotatable for deflecting the laser beam L from the semiconductor laser 52, an f8 lens 26 for passing the laser beam L therethrough, a cylindrical mirror 28 for reflecting the laser beam L, a preheater 30 positioned below and extending across the thermosensitive recording medium S for preheating the thermosensitive recording medium S to a temperature below the coloring temperature along the main scanning direction A, a heater driver 42 for energizing the preheater 30, a driver 32 for energizing the semiconductor laser 52, a multiplier 34 connected to the driver 32 for multiplying an image signal supplied from a controller 54 by shading correcting data, a correcting data memory 56 for storing the shading correcting data, a multiplier 58 connected between the heater driver 42 and the controller 54 for multiplying a preheater control signal from the controller 54 by shading correcting data, and a correcting data memory 60 for storing the shading correcting data to be supplied to the multiplier 58.

The thermal recording apparatus 50 operates as follows:

A process of determining shading correcting data for correcting different reflectances of the mirror facets 22a through 22f of the polygonal mirror 24 at the time the thermal recording apparatus 50 is shipped from the factory will be described below.

Figure 6A:
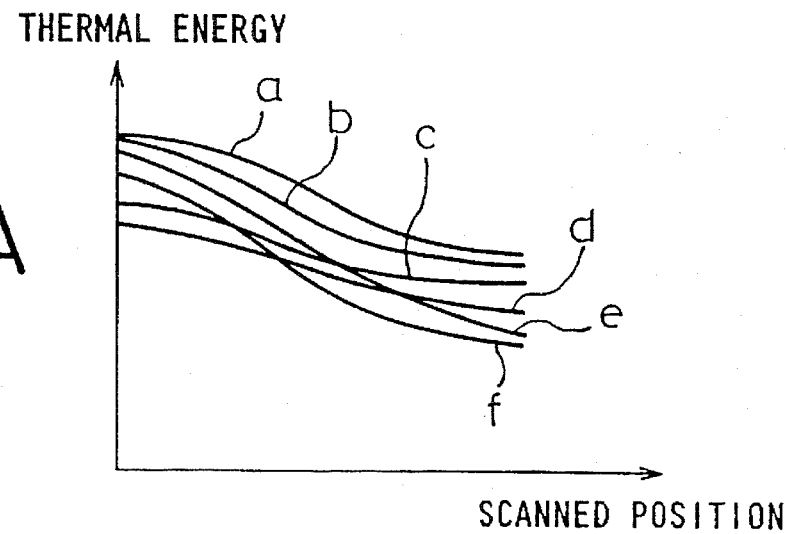
FIGS. 6A and 6B are diagrams illustrative of a process of generating shading correcting data for compensating for different reflectances of respective mirror facets of a polygonal mirror.

While the intensity of the laser beam L produced by the semiconductor laser 52 is being maintained at a constant level, the laser beam L is applied from the mirror facets 22a through 22f to the thermosensitive recording medium S, which is then colored. Based on the density of the colored area of the thermosensitive recording medium S, thermal energy characteristic curves as shown in FIG. 6A are obtained. Specifically, the thermal energy characteristic curves a~f represent the respective thermal energies of the laser beam L which are reflected by the mirror facets 22a through 22f and applied to the thermosensitive recording medium S. The thermal energies applied to the thermosensitive recording medium S are proportional to the respective reflectances of the mirror facets 22a through 22f. The different thermal energy characteristic curves a~f shown in FIG. 6A indicate that the laser beam L emitted from the semiconductor laser 52 is reflected by the mirror facets 22a through 22f that have differences in the reflectance, respectively.

Figure 6B:
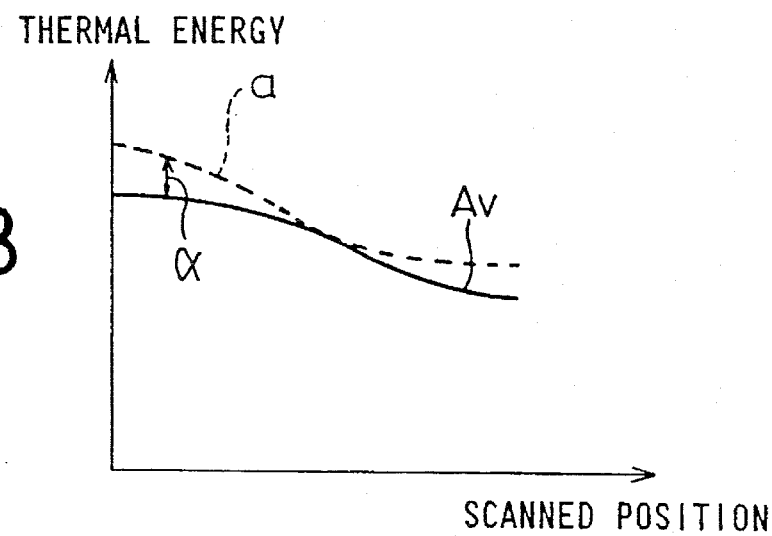
Figure 7:
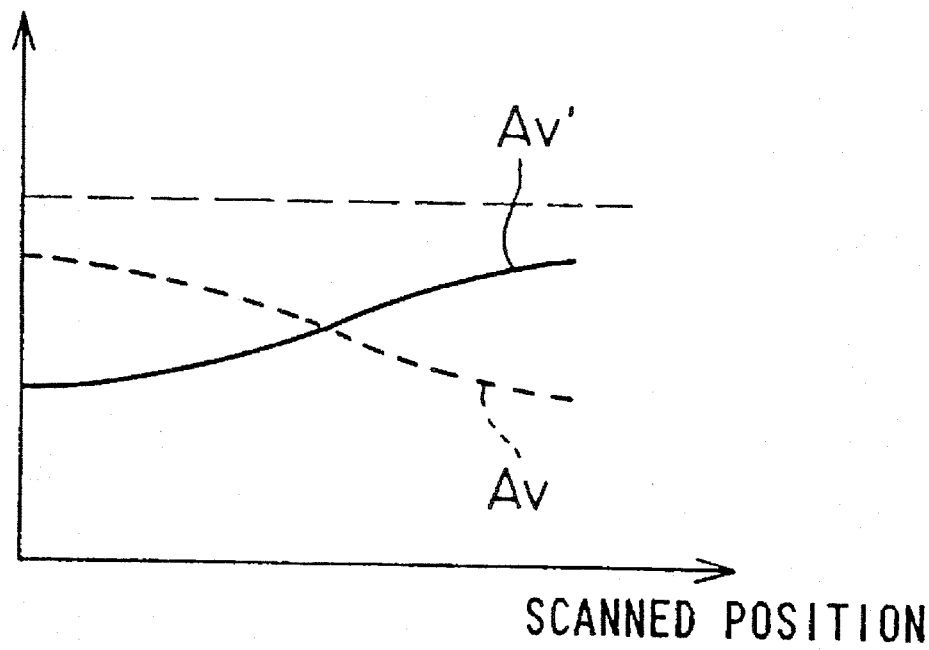
FIG. 7 is a diagram illustrative of the generation of shading correcting data for correcting the average of thermal energy characteristic curves relative to the mirror facets.

Shading owing to the differences in the reflectance of the mirror facets 22a through 22f is corrected by controlling the heat produced by the preheater 30 and the intensity of the laser beam L generated by the semiconductor laser 52 as follows:

First, as shown in FIG. 6B, an average value Av of the thermal energy characteristic curves a~f of the laser beam L reflected by the mirror facets 22a through 22f is determined. The thermal energy characteristic curve a may be represented by $(Av+\alpha)$ where a represents the difference between the average value Av and the thermal energy characteristic curve a. Shading correcting data Av' (see FIG. 7) for correcting the average value Av are stored in the correcting data memory 60. Shading correcting data $\alpha'$ for correcting the difference $\alpha$ are stored in the correcting data memory 56. Similarly, shading correcting data $\beta'$, $\gamma'$ . . . for correcting the differences $\beta$, $\gamma$ . . . between the average value Av and the thermal energy characteristic curves b, c . . . are also stored in the correcting data memory 56.

Now, the shading is corrected using the stored shading correcting data Av' (see FIG. 7) for correcting the average value Av and the stored shading correcting data $\alpha'$, $\beta'$, $\gamma'$ . . . for correcting the differences $\alpha$, $\beta$, $\gamma$ . . . . Specifically, the heat produced by the preheater 30 is corrected with the shading correcting data Av' and the intensity of the laser beam L generated by the semiconductor laser 52 is corrected with the shading correcting data $\alpha'$, $\beta'$, $\gamma'$ . . . .

More specifically, the controller 54 reads the shading correcting data Av' from the correcting data memory 60, and the multiplier 58 multiplies the shading correcting data Av' by a preheater control signal from the controller 54. A product signal from the multiplier 58 is applied to the heater driver 42, which energizes the heater elements 31a through 31g (see FIG. 3C) of the preheater 30 to preheat the thermosensitive recording medium S with variations in the average value Av being corrected.

The controller 54 also supplies an image signal to the multiplier 34, and reads the shading correcting data $\alpha'$, $\beta'$, $\gamma'$. . . from the correcting data memory 56 and supplies them to the multiplier 34. The multiplier 34 multiplies the image signal by the shading correcting data $\alpha'$, $\beta'$, $\gamma'$. . . , and supplies product signals to the driver 32, which control the intensity of the laser beam L generated by the semiconductor laser 52 based on the product signals. Therefore, the intensity of the laser beam M reflected by the mirror facets 22a through 22g and applied to the thermosensitive recording medium S is corrected to compensate for the differences between the reflectances of the mirror facets 22a through 22g.

The heat produced by the preheater 30 and the intensity of the laser beam L cooperate with each other in correcting the shading in the main scanning direction due to the different reflectances of the mirror facets 22a through 22g. The information such as character and image information recorded on the thermosensitive recording medium S is thus free from unwanted shading, i.e., density irregularities.

Both the shading correcting data stored in the correcting data memories 56, 60 may be employed to control only the intensity of the laser beam L produced by the semiconductor laser 52 for thereby compensating for the differences between the reflectances of the mirror facets 22a through 22g. Conversely, both the shading correcting data stored in the correcting data memories 56, 60 may be employed to control only the heat produced by the preheater 30 for thereby compensating for the differences between the reflectances of the mirror facets 22a through 22g.

While the polygonal mirror 24 with the mirror facets 22a through 22g having different reflectances is employed in the illustrated embodiments, the shading correcting data may be used to compensate for the differences between the transmittances of a plurality of holograms of a hologram scanner which may be employed in place of the polygonal mirror 24.

Although certain preferred embodiments of the present invention has been shown and described in detail, it should be understood that various changes and modifications may be made therein without departing from the scope of the appended claims.

What is claimed is:

1. A thermal recording apparatus comprising:

preheating means for preheating a thermosensitive recording medium, which has a support coated with a coloring agent, a color developer, and light-absorbing dyes, and can be colored to a density depending on thermal energy imparted thereto at a coloring temperature, along a scanning direction to a temperature below the coloring temperature;

recording means for recording information based on an image signal;

said recording means including heating means energizable based on said image signal for applying a light beam to said thermosensitive recording medium along said scanning direction to heat the thermosensitive recording medium to said coloring temperature to color the thermosensitive recording medium to thereby record the information based on said image signal;

density detecting means for detecting a density of a colored area of the thermosensitive recording medium; and shading correcting means for controlling the light beam generated by said heating means based on a density signal from said density detecting means for thereby correcting density irregularities on the thermosensitive recording medium.

2. A thermal recording apparatus comprising:

preheating means for preheating a thermosensitive recording medium, which has a support coated with a coloring agent, a color developer, and light-absorbing dyes, and can be colored to a density depending on thermal energy imparted thereto at a coloring temperature, along a main scanning direction to a temperature below the coloring temperature;

auxiliary scanning means for moving said thermosensitive recording medium in an auxiliary scanning direction substantially perpendicular to said main scanning direction;

recording means for recording information based on an image signal;

said recording means including heating means energizable based on said image signal for applying a light beam to said thermosensitive recording medium along said main scanning direction to heat the thermosensitive recording medium to said coloring temperature to color the thermosensitive recording medium to thereby record the information based on said image signal;

speed variation detecting means for detecting variations in a speed at which said thermosensitive recording medium is moved by said auxiliary scanning means; and shading correcting means for compensating for the variations in the speed at which said thermosensitive recording medium is moved by said auxiliary scanning means by controlling the light beam generated by said heating means based on a speed variation signal from said speed variation detecting means.

3. A thermal recording apparatus according to claim 1, wherein said shading correcting means comprises means for controlling both the light beam generated by said heating means and the heat generated by said preheating means.

4. A thermal recording apparatus according to claim 2, wherein said shading correcting means comprises means for controlling both the light beam generated by said heating means and the heat generated by said preheating means.

5. A thermal recording apparatus comprising:

preheating means for preheating a thermosensitive recording medium, which has a support coated with a coloring agent, a color developer, and light-absorbing dyes, and can be colored to a density depending on thermal energy imparted thereto at a coloring temperature, along a scanning direction to a temperature below the coloring temperature;

recording means for recording information based on an image signal;

said recording means including heating means energizable based on said image signal for applying a light beam to said thermosensitive recording medium along said scanning direction to heat the thermosensitive recording medium to said coloring temperature to color the thermosensitive recording medium to thereby record the information based on said image signal;

density detecting means for detecting a density of a colored area of the thermosensitive recording medium; and shading correcting means for controlling the heat produced by said preheating means based on a density signal from said density detecting means for thereby correcting density irregularities on the thermosensitive recording medium.

6. A thermal recording apparatus comprising:

preheating means for preheating a thermosensitive recording medium, which has a support coated with a coloring agent, a color developer, and light-absorbing dyes, and can be colored to a density depending on thermal energy imparted thereto at a coloring temperature, along a main scanning direction to a temperature below the coloring temperature;

auxiliary scanning means for moving said thermosensitive recording medium in an auxiliary scanning direction substantially perpendicular to said main scanning direction;

recording means for recording information based on an image signal;

said recording means including heating means energizable based on said image signal for applying a light beam to said thermosensitive recording medium along said main scanning direction to heat the thermosensitive recording medium to said coloring temperature to color the thermosensitive recording medium to thereby record the information based on said image signal;

speed variation detecting means for detecting variations in a speed at which said thermosensitive recording medium is moved by said auxiliary scanning means; and shading correcting means for compensating for the variations in the speed at which said thermosensitive recording medium is moved by said auxiliary scanning means by controlling heat produced by said preheating means based on a speed variation signal from said speed variation detecting means.

7. A thermal recording apparatus comprising:

preheating means for preheating a thermosensitive recording medium, which has a support coated with a coloring agent, a color developer, and light-absorbing dyes, and can be colored to a density depending on thermal energy imparted thereto at a coloring temperature, along a scanning direction to a temperature below the coloring temperature;

laser beam generating means energizable by an image signal for applying a laser beam to said thermosensitive recording medium to heat and color the thermosensitive recording medium at said coloring temperature;

light deflecting means positioned between said laser beam generating means and said thermosensitive recording medium and having a plurality of light deflectors for one of reflecting and transmitting the laser beam from said laser beam generating means to deflect light perpendicular to said scanning direction;

data storage means for storing an average thermal energy characteristic curve representing an average of respective thermal energy characteristic curves which represent respective thermal energies of the laser beam which are reflected by said plurality of light deflectors, and for storing thermal energy difference curves representing differences between said respective thermal energy characteristic curves and said average thermal energy characteristic curve; and shading correcting means for compensating for the variations in the laser beam thermal energy characteristics of said light deflectors by controlling the laser beam generated by said laser beam generating means based on said thermal energy difference curves and by controlling the heat generated by said preheating means based on said average thermal energy characteristic curve.

8. A thermal energy recording apparatus according to claim 7, wherein said data storage means further stores said respective thermal energy characteristic curves which represent the respective thermal energies of the laser beam which are reflected by said plurality of light deflectors; and wherein said shading correcting means further compensates for the variations in the laser beam thermal energy characteristics of said light deflectors by controlling the laser beam generated by said laser beam generating means based on said respective thermal energy characteristic curves.

9. A thermal energy recording apparatus according to claim 7, wherein said data storage means further stores said respective thermal energy characteristic curves which represent the respective thermal energies of the laser beam which are reflected by said plurality of light deflectors; and wherein said shading correcting means further compensates for the variations in the laser beam thermal energy characteristics of said light deflectors by controlling the heat generated by said preheating means based on said respective thermal energy characteristic curves.

* * * * *